UNITED STATES PATENT OFFICE.

THOMAS RICHARDSON, OF NEWCASTLE-ON-TYNE, ENGLAND, AND JOHN JAMES LUNDY, OF LEITH, AND ROBT. IRVINE, OF MAGDALEN CHEMICAL WORKS, COUNTY OF MID-LOTHIAN, NORTH BRITAIN.

IMPROVED PROCESS OF EXTRACTING OILS, &c., FROM VEGETABLE AND ANIMAL SUBSTANCES.

Specification forming part of Letters Patent No. 42,987, dated May 31, 1864.

*To all whom it may concern:*

Be it known that we, THOMAS RICHARDSON, of the town and county of Newcastle-on-Tyne, JOHN JAMES LUNDY, of Leith, in the county of Mid-Lothian, North Britain, color manufacturer, and ROBERT IRVINE, of Magdalen Chemical Works, in the said county of Mid-Lothian, all in the United Kingdom of Great Britain and Ireland, have invented certain new and useful Improvements in the Extraction and Manufacture of Oils from Vegetable and Animal Substances; and we hereby declare that the following is a full, clear, and exact description of the same.

This invention consists in the extracting the oil contained in certain vegetable substances—such, for instance, as cotton-seed, linseed, rape-seed, colza-seed, hemp-seed, poppy-seed, mustard-seed, olives, and palm or other oil-producing nuts—and also from certain animal substances—such as fish, the carcasses of animals, and refuse animal matter—by means of the solvent power contained in the volatile hydrocarbons obtained from petroleums or other earth oils, and similar volatile hydrocarbons obtained from asphaltum-oil, coal-oil, or shale-oil, such hydrocarbons, for the purposes of this invention, being required to be volatile under 212° Fahrenheit; and in order that this invention may be fully understood, we shall now proceed more particularly to describe the manner in which the same may be used or carried into effect.

We introduce the vegetable or animal substances to be operated upon—which had better, in the case of vegetable substances, be previously crushed by any of the well-known methods at present in use, or the refuse cakes from the processes at present in use by seed-crushers, and in case of animal substances in a state of division obtained in any convenient manner—into one or a series of vessels capable of being closed or sealed, so as to prevent the evaporation of the solvent or solvents employed; and these vessels we call "extractors." The solvent or solvents, either in a cold or warm state, are then run into the same vessel or vessels and dissolve out or extract the oil by solution from the vegetable or animal substances or materials operated upon. The vessel may be first filled with the vegetable or animal substances, and as much of the volatile hydrocarbons then passed into the extractor as that vessel will conveniently hold, after having been allowed to macerate. The solvent or solvents containing the oil or oils in solution are then run off into a separate vessel or closed receiver, and a fresh portion of the solvent or solvents employed is run into the extractors.

The second application of the solvent or solvents is generally sufficient to complete the extraction of the oil from the substances operated upon. If necessary, however, further application of the solvent or solvents may be made until the oil is practically extracted from the substances under treatment. The residue remaining in the extractor may be then treated by means of steam to expel the solvent or solvents in a state of vapor from the residue, such vapor being condensed with the steam introduced, and the solvent or solvents separated, so as to be again used for operating upon fresh portions of the vegetable or animal substances or materials first hereinbefore mentioned.

In order to facilitate the operation, the materials to be operated upon and the solvent may be either, or both of them, warmed previous to or during their use.

In order to separate the oil contained in solution from the solvent the solvents containing the oil in solution may be heated in a separate vessel by means of steam introduced through coils of pipes, which, by heating the mixed solution of solvent and fixed oils, drive off the volatile hydrocarbons or solvents, which, being caused to pass through a coil of pipes surrounded with cold water, are condensed, and may again be used for the purpose of treating fresh portions of vegetable or animal matters or substances, so that the original solvent in this process may be used with only slight loss for repeated operations.

We desire it to be understood that we do not claim as novel any part of the apparatus above described; and we are aware that other apparatus of a well-known nature may be use-fully employed for the purposes of this invention; but we have described the above as having been found practically efficient. Neither do we consider our invention practically applicable to the extraction of essential or volatile oils, such as lavender; but

What we claim as the invention secured to us by the hereinbefore in part recited Letters Patent is—

The mode of extracting the fixed oil contained in vegetable substances, such as seeds and nuts, and in animal substances, such as fish, the carcasses of animals, and refuse animal matter, by means of the solvent properties of the volatile hydrocarbons hereinbefore mentioned.

In testimony whereof we have signed our names to this specification in the presence of two subscribing witnesses.

THOMAS RICHARDSON.
JOHN JAMES LUNDY.
ROBERT IRVINE.

Witnesses to the signature of Thomas Richardson:
JOSHUA NUNN,
    *Deputy Consul, London.*
A. J. COTTRELL,
    *Consulate U. S. A., London.*

Witnesses to the signatures of John James Lundy and Robert Irvine:
NEIL MCLACHLAN,
    *U. S. C.*
RICHD. B. KELLIE.